FIP8106 OR 3,415,995
333
Dec. 10, 1968 J. R. KERR 3,415,995
POLARIZATION MODULATION OPTICAL COMMUNICATION SYSTEM 600,910
Filed Dec. 12, 1966
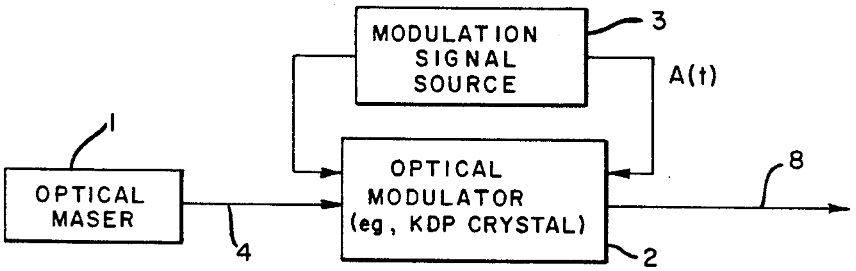
FIG-1
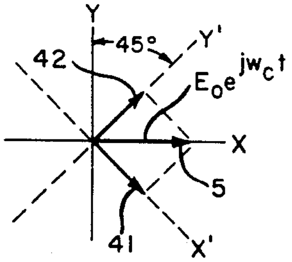
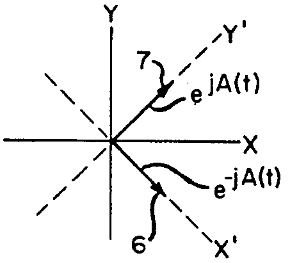
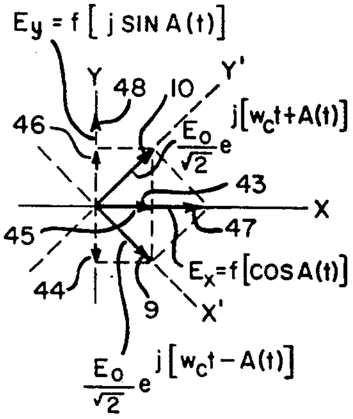
FIG-3 FIG-4 FIG-5
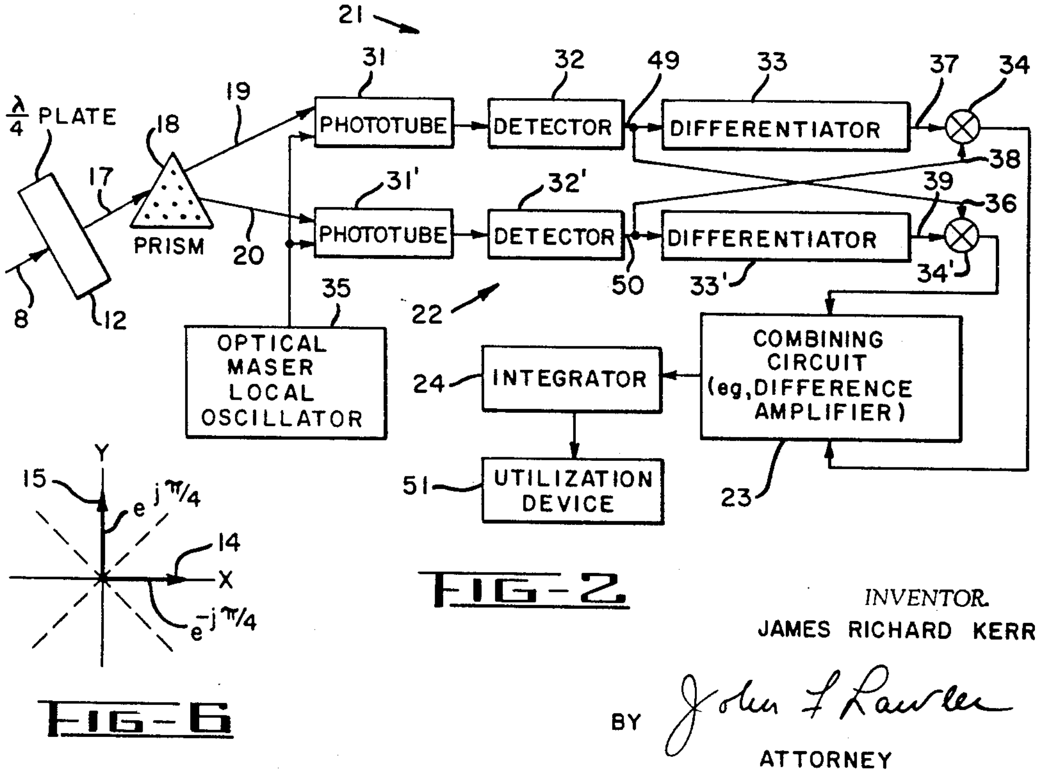
FIG-2 FIG-6
INVENTOR.
JAMES RICHARD KERR
BY John F Lawler
ATTORNEY 3,415,995

POLARIZATION MODULATION OPTICAL COMMUNICATION SYSTEM

James Richard Kerr, Tigard, Oreg., assignor to Sylvania Electric Products Inc., a corporation of Delaware Filed Dec. 12, 1966, Ser. No. 600,910
7 Claims. (Cl. 250—199)

ABSTRACT OF THE DISCLOSURE

The received components of a polarization modulated signal that vary sinusoidally and cosinusoidally as a function of the modulation signal are processed in associated channels wherein the derivative of the signal in each channel is multiplied by the signal in the other channel. The difference signal between the product outputs of the channels is integrated to reproduce the modulation signal.

*Background of invention*

This invention relates to communication systems and more particularly to an improved polarization modulation optical communication system.

In conventional polarization modulation systems, the linear polarization of the light beam from a laser source is altered by passing the beam through an electro-optic cell to which a modulation voltage is applied. The modulation voltage is a function of intelligence or information communicated by the system. The cell converts the linear polarization of the light beam to other states of polarization by an amount determined by the modulation voltage. At the receiver, the polarized light beam is resolved into two orthogonal linearly polarized light beams. A crossed analyzer may be employed to pass one of the light beams to a single photodetector to provide an output signal which is a nonlinear function of the modulation voltage. Alternatively, the light beams may be spatially separated and each detected in an associated photodetector in order to utilize all of the light signals as disclosed by Niblack and Wolf in Patent No. 3,284,632, Polarization Modulation and Demodulation, which is assigned to the assignee of this application, and in Applied Optics, volume 3, No. 2, February 1964, pages 227–279. The output signals of the photodetectors are combined in a difference amplifier to cancel the effects of linearly polarized background light. The difference signal is demodulated to obtain an output that is a function of the modulation voltage. The modulation voltage is applied to a utilization circuit such as a signal processor.

Since these prior art systems produce an output which is a nonlinear function of the modulation voltage instead of the modulation signal itself, a relatively small modulation index must be maintained in order to reduce distortion in the output signal to an insignificant value.

An object of this invention is the provision of an improved polarization modulation optical communication system for reception of polarization modulation signals with high modulation index.

*Summary of invention*

The amplitudes of the two orthogonal components of the polarization modulated output signal of the transmitter are directly proportional to the sine and cosine of the modulation signal. These components are converted in the receiver to two orthogonal linearly polarized light beams that are spatially separated. These spatially separated light beams are each mixed with a laser local oscillator signal and detected to produce electrical signals in associated channels that are proportional to the sine and cosine of the modulation signal. The derivative of the signal in each channel is multiplied by the signal in the other channel. Thus, the outputs of the two channels are proportional to the product of the derivative of the modulation signal with the square of the sine and the square of the cosine of the modulation signal, respectively. These product signals are combined in a difference amplifier to produce an output directly proportional to the derivative of the modulation signal. The output of the difference amplifier is integrated to reproduce the modulation signal.

*Brief description of drawings*

The invention will be more fully understood from the following detailed description of a preferred embodiment thereof, together with the following drawings wherein:

FIGURE 1 is a block diagram of the transmitter of a polarization modulation optical communication system embodying this invention;

FIGURE 2 is a block diagram of the receiver of a polarization modulation optical communication system embodying this invention; and FIGURES 3–6 are vector representations of optical signals in the system wherein FIGURE 3 represents the output of the optical maser signal source, FIGURE 4 represents the operation of the optical modulator, FIGURE 5 represents the output of the optical modulator, and FIGURE 6 represents the operation of the quarter wave plate.

*Description of preferred embodiment*

Referring now to FIGURE 1, the transmitter comprises an optical maser 1, an optical modulator 2, and a source 3 of modulation signal. Optical maser 1 preferably is a single frequency laser system such as disclosed in patent application Ser. No. 411,441, filed Nov. 16, 1964, Method and Apparatus for Producing Light Having a Single Frequency, by Gail A. Massey and assigned to the assignee of this application. The optical output signal or light beam 4 from optical maser 1 is expressed as $$E_0 e^{j\omega_c t}$$

wherein $E_0$ is the maximum electric field intensity of light beam 4, $\omega_c$ is the radian frequency at which optical maser 1 oscillates, $e$ is the base of the natural logarithm, $j$ is $\sqrt{-1}$, and $t$ is time. Light beam 4 is preferably linearly polarized and is represented in FIGURE 3 by the vector 5 which is parallel to the $x$ reference axis.

Optical modulator 2 may, by way of example, be a Pockels-effect modulator comprising an electro-optic crystal such as potassium dihydrogen phosphate (KDP). The optic axis of the KDP crystal is parallel to light beam 4 so the light beam is unmodulated by the crystal when a modulation voltage is not applied thereto. The modulation voltage from source 3 is applied to the crystal parallel to the optic axis as illustrated in FIGURE 1. The principal cleavage planes of the crystal are parallel to the $x$ and $y$ reference axes. Thus, the crystal develops two electrically-induced principal axes $x'$ and $y'$, see FIGURE 4, which are oriented at 45° with respect to the $x$ and $y$ axes, when the modulation voltage is applied to the crystal. The effect of the optical modulator on light beam components along the $x'$ and $y'$ axes is represented by vectors 6 and 7 in FIGURE 4. The light beam 8 from the optical modulator is elliptically polarized and is represented by the vectors 9 and 10 in FIGURE 5.

The receiver, see FIGURE 2, comprises quarter wave plate 12 and prism 18, first and second channels 21 and 22, combining circuit 23, and integrator 24. The principal cleavage planes of the naturally birefringent crystal comprising plate 12 are oriented parallel to the $x'$ and $y'$ axes so that the fast and slow axes of the quarter wave plate are parallel to the $x$ and $y$ axes, respectively. The operation of the quarter wave plate on light beam 8 is represented by the vectors 14 and 15 in FIGURE 6. The output 17 of plate 12 is two light beams which are superimposed and linearly polarized along the $x$ and $y$ axes.

The optic axis of prism 18 is parallel to the faces thereof and perpendicular to beam 17 so that prism 18 divides the two superimposed light beams into two spatially separated light beams 19 and 20. Prism 18 may, by way of example, be a Wollaston prism which is oriented so that its slow and fast axes are parallel to the $x$ and $y$ axes, respectively.

Channels 21 and 22 each comprise photodetector 31, linear detector 32, differentiator 33, and mixer 34. The respective pairs of components in the two channels are preferably balanced so that signals in each channel are affected equally on passage therethrough. Photodetectors 31 and 31' are square-law devices sensitive to laser radiation and may, by way of example, be of the type described in patent application Ser. No. 444,241, filed Mar. 31, 1965, now Patent 3,390,272, issued June 25, 1968, High Frequency Photomultiplier, by Mahlon B. Fisher and assigned to the assignee of this invention. Optical maser local oscillator 35 and photodetectors 31 and 31' comprise linear detectors for translating light beams 19 and 20 to electromagnetic signals in the microwave frequency range or lower. The optical local oscillator signal and the light beams 19 and 20 are simultaneously incident on the light sensitive areas (not shown) of the associated photodetectors. These combine the optical signals to produce a difference frequency signal at the outputs of the phototubes. Detectors 32 and 32' extract the modulation signals from the difference signal outputs of the photodetector.

The output of detector 32 is applied directly on line 36 to the mixer 34' of the adjacent channel 22 and is differentiated and applied on line 37 to the associated mixer 34. Similarly, the output of detector 32' is applied directly on line 38 to the mixer 34 of the adjacent channel 21 and is differentiated and applied on line 39 to the associated mixer 34'. The mixer outputs contain signals proportional to the product of the associated inputs. The product outputs of the mixers are combined in circuit 23, which may be a difference amplifier, to provide an output which is directly proportional to the derivative of the modulation signal. The output of combining circuit 23 is operated on by integrator 24 which reproduces the modulation signal.

The vector 5, see FIGURE 3, which represents light beam 4 may be resolved into its component vectors 41 and 42 which are parallel to the $x'$ and $y'$ axes. The component vectors 41 and 42 are both representable as $$\frac{E_o}{\sqrt{2}}e^{j\omega_c t} \tag{2}$$

When a modulation signal voltage A($t$) (a voltage which varies as a function A of time $t$) is applied to the modulator, incident light signals polarized along the $x'$ and $y'$ axes experience the retardations $e^{-jA(t)}$ and $e^{jA(t)}$, respectively, represented by the vectors 6 and 7 in FIGURE 4. Thus, the vector component 41 is retarded in phase by the operation of modulator 2 whereas component vector 42 is advanced in phase. In this manner, the modulator converts the linearly polarized light beam 4 to an elliptically polarized light beam 8 comprised of the vectors 9 and 10 parallel to the $x'$ and $y'$ axes, respectively, which are representable as $$\frac{E_o}{\sqrt{2}}e^{j[\omega_c t-A(t)]} \tag{3}$$

and $$\frac{E_o}{\sqrt{2}}e^{j[\omega_c t+A(t)]} \tag{4}$$

Light beam 8 is also representable by component vectors parallel to the $x$ and $y$ axes. Vector 9 may be converted to the associated component vectors 43 and 44 which are parallel to the $x$ and $y$ axes and are representable as $$\pm\frac{1}{\sqrt{2}}\frac{E_o}{\sqrt{2}}e^{j[\omega_c t-A(t)]} \tag{5}$$

respectively. Similarly, vector 10 may be converted to the associated component vectors 45 and 46 which are parallel to the $x$ and $y$ axes, respectively, and are each representable as $$\frac{1}{\sqrt{2}}\frac{E_o}{\sqrt{2}}e^{j[\omega_c t+A(t)]} \tag{6}$$

Vector 47 is the sum of the component vectors 43 and 45 and is representable as $$E_x=\frac{E_o}{2}e^{j[\omega_c t-A(t)]}+\frac{E_o}{2}e^{j[\omega_c t+A(t)]} \tag{7}$$

$$=E_o e^{j\omega_c t}\frac{e^{jA(t)}+e^{-jA(t)}}{2} \tag{8}$$

$$=E_o e^{j\omega_c t}[\cos A(t)] \tag{9}$$

$$=f[\cos A(t)] \tag{10}$$

Similarly, vector 48 is the sum of the component vectors 44 and 46 and is representable as $$E_y=-\frac{E_o}{2}e^{j[\omega_c t-A(t)]}+\frac{E_o}{2}e^{j[\omega_c t+A(t)]} \tag{11}$$

$$=E_o e^{j\omega_c t}\frac{e^{jA(t)}-e^{-jA(t)}}{2} \tag{12}$$

$$=E_o e^{j\omega_c t}[j\sin A(t)] \tag{13}$$

$$=f[j\sin A(t)] \tag{14}$$

Thus, light beam 8 is representable by a pair of orthogonally polarized light beams corresponding to vectors 47 and 48 which are parallel to the $x$ and $y$ axes, respectively. The amplitude of these vectors varies as a function of the cosine and sine of the modulation signal A($t$). The $j$ factor in Equation 14 indicates that the sinusoidally varying signals are 90° out-of-phase.

Quarter wave plate 12 introduces a net retardation in vectors 47 and 48 which compensates for the 90° phase difference between these signals. Specifically, plate 12 causes a retardation in the phase of vector 47 of $\pi/2$ radians, with respect to vector 48, or equivalently, of $\pi/4$ radians in the phase of vector 47 and causes the phase of vector 48 to advance the same amount. Thus, the output 17 of the quarter wave plate comprises two coincident light beams which are in-phase and linearly polarized along the $x$ and $y$ axes. Prism 18 spatially separates the two coincident light beams into a first light beam 19 which varies sinusoidally as a function of the modulation signal A($t$) and a second light beam 20 which varies cosinusoidally as a function of the modulation signal A($t$).

Phototubes 31 and 31' combine the associated light beams from the prism and the local oscillator signal to produce intermediate frequency difference signals which are detected to provide signals on lines 49 and 50 which are proportional to the sine and cosine, respectively, of the modulation signal A($t$). These signals are differentiated before being applied to the associated mixer so that the signals applied to mixer 34 are representable as $$A'(t)\cos A(t) \tag{15}$$

and $$\cos A(t) \tag{16}$$

wherein $A'(t)$ is the derivative of the modulation signal $A(t)$. Conversely, the signals applied to mixer 34' are representable as $$-A'(t)\sin A(t) \tag{17}$$

and $$\sin A(t) \tag{18}$$

In order to eliminate distortion in the output of the receiver, mixers 34 and 34' are preferably perfect square law devices. Thus, the outputs of mixers 34 and 34' are representable as $$A'(t)\cos^2 A(t) \tag{19}$$

and $$-A'(t)\sin^2 A(t) \tag{20}$$

respectively. The mixer outputs are combined in difference amplifier 23

$$[A'(t)\cos^2 A(t)]-[-A'(t)\sin^2 A(t)]. \tag{21}$$

$$=A'(t)[\sin^2 A(t)+\cos^2 A(t)] \tag{22}$$

$$=A'(t) \tag{23}$$

to produce the output indicated in Equation 23 that is directly proportional to the derivative of the modulation signal $A(t)$. The output of the difference amplifier is integrated by integrator 24 to reproduce the modulation signal $A(t)$ which may be operated on by a utilization device 51 such as a signal processor or signal identifier.

If the mixers are not perfect square law devices, they may be connected in a balanced configuration to cancel the applied signals in the mixer outputs. If the outputs of the mixers also contain higher order terms of the sum or product of the applied signals, distortion components of the form $\cos^2 A(t)$ will also appear in the mixer output. These distortion components cannot be filtered from the mixer outputs, however, since this is the form of the signals comprising the mixer outputs represented by Equations 19 and 20. It should be noted that these signals will be several orders of magnitude less than the magnitude of the first or principal product term in the mixer outputs, however, and will therefore introduce only a nominal distortion in the modulation signal $A(t)$ produced by the integrator.

Although this invention is described in relation to a preferred embodiment thereof, modifications thereof will be apparent to those skilled in the art. The scope of this invention is therefore to be determined from the appended claims rather than from the above-detailed description.

What is claimed is:

1. A communication system comprising
   a transmitter comprising
      a first signal source for generating an electromagnetic wave carrier signal,
      a second signal source for producing a modulation signal,
      means responsive to the modulation signal and the carrier signal for producing a polarization modulated carrier signal output comprised of first and second orthogonal components which are functions of the sine and cosine, respectively, of the modulation signal, and
   a receiver comprising
      first and second signal processors,
      means for dividing the polarization modulated carrier signal output of said transmitter for coupling only said first component to said first processor and only said second component to said second processor,
      means for combining outputs of only said first and second signal processors for producing an output proportional to the derivative of the modulation signal,
      means for integrating the output of said combining means for reproducing the modulation signal, and
      utilization means responsive to the output of said integrating means.

2. A communication system comprising
   a transmitter comprising
      a first signal source for generating an electromagnetic wave carrier signal,
      a second signal source for producing a modulation signal,
      means responsive to the modulation signal and the carrier signal for producing a polarization modulated carrier signal output comprised of first and second orthogonal components which are functions of the sine and cosine, respectively, of the modulation signal, and
   a receiver comprising
      first and second signal processors,
      means for dividing the polarization modulated carrier signal output of said transmitter for coupling said first component to said first processor and said second component to said second processor,
      each of said signal processors comprising
         means for detecting the associated component output of said signal dividing means for producing an output signal proportional to a predetermined ratio of the modulation signal,
         means responsive to the output signals of said detecting means for producing an output signal proportional to the derivative thereof, and
         means for multiplying the output signals of said differentiator means and the output signal of said detector means of the other signal processor,
         said predetermined ratio being the sine for one of said processors and the cosine for the other,
      means for combining the outputs of said signal processors for producing an output proportional to the derivative of the modulation signal,
      means for integrating the output of said combining means for reproducing the modulation signal, and
      utilization means responsive to the output of said integrating means.

3. The system according to claim 2 wherein said first signal source is an optical maser producing a light beam output and said modulator means is an optical modulator converting the output of said optical maser to an elliptically polarized light beam comprising orthogonal components which are functions of the sine and cosine of the modulation signal, said dividing means comprising
   means for converting the elliptically polarized light beam from said optic modulator to first and second orthogonal linearly polarized light beams which are a function of the sine and cosine, respectively, of the modulation signal, and
   means for spacially separating the orthogonal linearly polarized light beams from said converting means.

4. Apparatus for recovering modulation signals from a carrier signal that is polarization modulated by the modulation signal and is comprised of first and second orthogonal components which are functions of the sine and cosine of the modulation signal, said apparatus comprising
   means for dividing the polarization modulated carrier signal into first and second output signals proportional to the first and second components, respectively, first and second signal processors responsive to the first and second outputs, respectively, of said dividing means for producing first and second output signals proportional to the products of the derivative of the modulation signal and the square of the sine of the modulation signal and the square of the cosine of the modulation signal, respectively, means for combining the outputs of said signal processors for producing an output proportional to the derivative of the modulation signal, means for integrating the output of said combining means for reproducing the modulation signal, and utilization means responsive to the output of said integrating means.

5. Apparatus according to claim 4 wherein each of said signal processors comprises means for detecting the associated component signal output of said dividing means for producing an output signal proportional to a predetermined ratio of the modulation signal, means responsive to the output signal of said detecting means for producing an output signal proportional to the derivative thereof, and means for multiplying the output signal of said differentiator means and the output signal of said detector means of the other signal processor, said predetermined ratio being the sine for one of said processors and the cosine for the other.

6. The system according to claim 2 wherein said detecting means are linear detectors receiving the associated component outputs of said signal dividing means for producing output signals that are directly proportional to the sine and cosine of the modulation signal.

7. The system according to claim 2 wherein said multiplier means are each responsive only to the output signal of the associated differentiator means and the output signal of said detector means of the other signal processor for producing outputs proportional to the products of the derivative of the modulation signal and the square of the sine of the modulation signal and the square of the cosine of the modulation signal, respectively.

References Cited

UNITED STATES PATENTS

| | | | |
|---|---|---|---|
| 3,258,597 | 6/1966 | Forrester | 250—199 |
| 3,284,632 | 11/1966 | Niblack et al. | 250—199 |
| 3,310,677 | 3/1967 | Pierce et al. | 250—199 |

ROBERT L. GRIFFIN, *Primary Examiner.*

A. MAYER, *Assistant Examiner.*